(12) United States Patent
Horn et al.

(10) Patent No.: US 10,844,726 B2
(45) Date of Patent: Nov. 24, 2020

(54) BLADE AND ROTOR FOR A TURBOMACHINE AND TURBOMACHINE

(71) Applicant: MTU Aero Engines AG, Munich (DE)

(72) Inventors: Wolfgang Horn, West Hartford, CT (US); Daniel Theurich, Stockdorf (DE); Martin Becker, Dachau (DE); Axel Stettner, Dachau (DE); Wilfried Schuette, Oberhaching-Furth (DE); Michael Junge, Munich (DE); Hans-Peter Hackenberg, Olching (DE); Alexander Halcoussis, Haimhausen (DE); Hannes Wolf, Mammendorf (DE)

(73) Assignee: MTU Aero Engines AG, Munich (DE)

( * ) Notice: Subject to any disclaimer, the term of this patent is extended or adjusted under 35 U.S.C. 154(b) by 34 days.

(21) Appl. No.: 16/163,633

(22) Filed: Oct. 18, 2018

(65) Prior Publication Data

US 2019/0120061 A1   Apr. 25, 2019

(30) Foreign Application Priority Data

Oct. 23, 2017 (DE) .................... 10 2017 218 886
Aug. 22, 2018 (EP) .................... 18190329

(51) Int. Cl.
| | | |
|---|---|---|
| *F01D 5/14* | (2006.01) | |
| *C23C 28/04* | (2006.01) | |
| *B32B 7/00* | (2019.01) | |

(52) U.S. Cl.
CPC ............. *F01D 5/147* (2013.01); *B32B 7/00* (2013.01); *C23C 28/042* (2013.01); *F01D 5/143* (2013.01);

(Continued)

(58) Field of Classification Search
None
See application file for complete search history.

(56) References Cited

U.S. PATENT DOCUMENTS 5,984,314 A * 11/1999 Peters ............... F01D 11/02
                                                   277/412
6,181,978 B1 * 1/2001 Hinds ............... G06T 17/20
                                                   700/182

(Continued)

FOREIGN PATENT DOCUMENTS

DE   102010060152 A1   4/2012
DE   102013219814 B3   11/2014

(Continued)

OTHER PUBLICATIONS

Wissner, C., "Contributions to Fail Safe Design," Dissertation, Karlsruhe Institute of Technology, Faculty of Mechanical Engineering, KIT Scientific Publishing 2010.

(Continued)

*Primary Examiner* — Michael Lebentritt
(74) *Attorney, Agent, or Firm* — Barlow, Josephs & Holmes, Ltd.

(57) ABSTRACT

The invention relates to a blade for a turbomachine, comprising a blade element with a suction side and a pressure side, which extend between a leading edge and a trailing edge of the blade element, as well as a blade root for connection of the blade at a main rotor body, wherein the blade comprises a crack-affecting device, which, in the radial direction, has an altered cross-sectional geometry in comparison to an aerodynamically optimized blade profile. The invention further relates to a rotor for a turbomachine having at least one such blade, a turbomachine having at least one such blade, and/or with such a rotor as well as a method for producing a blade.

18 Claims, 6 Drawing Sheets

(52) U.S. Cl.
CPC ...... *F05D 2220/32* (2013.01); *F05D 2230/10* (2013.01); *F05D 2230/313* (2013.01); *F05D 2230/50* (2013.01); *F05D 2240/24* (2013.01); *F05D 2240/301* (2013.01); *F05D 2240/305* (2013.01); *F05D 2240/306* (2013.01); *F05D 2240/80* (2013.01); *F05D 2250/71* (2013.01); *F05D 2260/941* (2013.01); *F05D 2300/611* (2013.01)

(56) References Cited

U.S. PATENT DOCUMENTS

| | | | |
|---|---|---|---|
| 6,481,967 | B2 | 11/2002 | Tomita et al. |
| 6,524,070 | B1* | 2/2003 | Carter ............... F01D 5/141 416/193 A |
| 8,047,787 | B1* | 11/2011 | Liang ............... F01D 5/187 416/97 R |
| 9,920,633 | B2 | 3/2018 | Bergman et al. |
| 10,502,230 | B2* | 12/2019 | Anderson ......... F04D 29/325 |
| 2001/0016163 | A1* | 8/2001 | Tomita ............... F01D 5/186 416/193 A |
| 2004/0062636 | A1* | 4/2004 | Mazzola ............ F01D 5/145 415/115 |
| 2004/0126239 | A1* | 7/2004 | Gautreau ........... F01D 5/16 416/220 R |
| 2006/0275112 | A1* | 12/2006 | Lee ................... F01D 5/143 415/191 |
| 2007/0128041 | A1 | 6/2007 | Ahmad et al. |
| 2009/0246032 | A1* | 10/2009 | Stone ................. B23C 3/18 416/223 R |
| 2010/0284815 | A1* | 11/2010 | Parker ................ F01D 5/14 416/223 A |
| 2011/0033305 | A1* | 2/2011 | Ahmad .............. F01D 5/143 416/223 R |
| 2011/0064583 | A1* | 3/2011 | Billotey ............ F01D 5/141 416/234 |
| 2013/0232991 | A1* | 9/2013 | Otero ................. F01D 5/187 60/806 |
| 2014/0150454 | A1* | 6/2014 | Faulder ............. F01D 5/141 60/805 |
| 2016/0003076 | A1* | 1/2016 | Aiello ............... F16J 15/445 415/173.1 |
| 2016/0258296 | A1* | 9/2016 | Bergman ........... F01D 9/041 |
| 2016/0265551 | A1* | 9/2016 | Bailey ............... F01D 9/041 |
| 2017/0009587 | A1* | 1/2017 | Szymanski ........ F01D 5/141 |
| 2017/0009589 | A1* | 1/2017 | Gupta ................ F01D 5/147 |
| 2019/0178094 | A1* | 6/2019 | Schutte ............. B23P 15/006 |

FOREIGN PATENT DOCUMENTS

| | | |
|---|---|---|
| EP | 0945594 A1 | 9/1999 |
| EP | 1525942 A1 | 4/2005 |
| EP | 1383987 B1 | 1/2006 |
| EP | 1731712 A1 | 12/2006 |
| EP | 1757773 A1 | 2/2007 |
| EP | 2754515 A2 | 7/2014 |
| EP | 2998507 A1 | 3/2016 |
| EP | 3064711 A1 | 9/2016 |
| EP | 3241989 A1 | 11/2017 |
| EP | 3431713 A1 | 1/2019 |
| GB | 2251897 A | 7/1992 |
| JP | H0544691 A1 | 2/1993 |
| JP | H1061406 A | 3/1998 |
| JP | 2000130103 A | 5/2000 |
| WO | 2012055881 A1 | 5/2012 |

OTHER PUBLICATIONS

Kohler, M. et al., "Load Assumption for Fatigue Design of Structures and Components,", Springer-Verlag GmbH, Germany 2017.
Wang, Fengchan et al., "Study of uncontained turbine engine rotor failure airworthiness compliance verification method", Procedia Engineering 17 (2011) 531-541, Jul. 16, 2014.

* cited by examiner

VII-VII

BLADE AND ROTOR FOR A TURBOMACHINE AND TURBOMACHINE

BACKGROUND OF THE INVENTION

The invention relates to a blade and a rotor for a turbomachine. The invention further relates to a turbomachine having at least one such blade or having at least one such rotor.

Blades in rotating turbomachines are subject to high mechanical loads, which are caused, in particular, by centrifugal forces, vibrations, and thermal gradients. When there is an excessive local load, cracks may occur in the material of the blades and grow into the component under the influence of mechanical and thermal stresses. Particularly in the case of integrally bladed rotors, such as, for example, in the case of blisks (bladed disks) or blings (bladed rings), the blades and the disks or rings are composed of an integral or monolithic component. Furthermore, it needs to be taken into consideration that objects can enter the engine and, when they impinge at the blades, can cause a crack. Particularly owing to the combination of these circumstances, cracks can migrate from the blades into the disk or ring elements and, under certain circumstances, can even lead to a failure of the entire component.

The rotors and blisks are arranged on an engine shaft, with which they rotate around an engine axis. Therefore, three main axes are defined to describe the geometries occurring in the engines. The first main axis extends in the direction of the axis of rotation of the engine and is referred to as the longitudinal axis, which extends in the axial direction. The first main axis establishes a front and a rear of the respective geometry in question, with the entry of the gas flow occurring in the front and the exit of the gas flow occurring in the rear. The second axis extends along a direction that is perpendicular to the axis of rotation of the engine and is also referred to as the radial axis, which extends in the radial direction. The second main axis defines an outside and an inside of the engine, with the engine axis lying inside and the radial direction extending outward from the engine axis. The third main axis extends in the peripheral direction perpendicular to the two other main axes and joins the meridional sections formed by the first two main axes. The three main axes together define three main planes: meridional planes, which are spanned by the longitudinal axis and, in each plane, by a radial axis; peripheral planes, which lie on a cylindrical outer surface around the axis of rotation; and cross-sectional planes of the engine, which are arranged perpendicular to the axis of rotation of the engine.

Blades having a complex spatial geometry are normally described by blade profiles stacked one on top of the other, the profile surface extensions of which need not necessarily lie in only one peripheral plane, but rather, as blade profiles having a curved contour, can also intersect the other main planes. This structure is mainly due to the aerodynamic design of the blades and the specifications placed on the main flow duct that the edges thereof, in particular the inner shroud or endwall, do not extend axially parallel to the main axis. The final form, in particular in the hub or endwall region, additionally deviates from this aerodynamically optimized and, in particular, ideal blade profile for structural-mechanical reasons; in most cases, so-called fillets are arranged in this endwall region. A stack line forms the geometric focal point of the aerodynamically optimized blade profile, with the stack line representing a measure for the pitch of the blade.

Blade profiles are further described by a camber line extending from the front edge or leading edge to the rear edge or trailing edge of the blade profile as well as by the edge lines at the blade surface that extend around the periphery of the blade profile and typically form a droplet shape having a suction side and a pressure side.

The camber line is the profile center line from the leading edge to the trailing edge of the blade and corresponds to a connecting line through all center points of circles inscribed in the blade profile. In the simplest approximation, this connecting line can be described by straight lines arrayed next to one another, but also by splines or other polynomial curves through the center points. When the blade is divided axially into one hundred parts and more by one hundred inscribed circles that are axially spaced apart equidistantly from one another, for example, and the center points of the circles are connected by straight lines, an adequate accuracy is obtained for the course of the camber line, which can serve as at least a first reference point in the determination of the geometric positions of the points involved.

The leading edge and the trailing edge can also be formed by circular segments, because, in turbomachines and especially in the main gas ducts of these turbomachines, it is desirable to avoid sharp edges. However, in the following, the leading edge and the trailing edge will be reduced to a line, that is, to a juxtaposition of points on the surface of the blade. The following method serves to fix a point of this leading edge line or trailing edge line on a profile as a leading edge point or as a trailing edge point. Inscribed circles can be placed up to the leading edge or trailing edge of the blade. At the leading edge and at the trailing edge, the camber line extends from the center point of the leading edge circle or from the center point of the trailing edge circle just in the direction toward the leading edge or trailing edge. In good approximation, this direction corresponds to the direction of the connecting line of the penultimate center point of a circle to the last center point of a circle of the respective inscribing circles, because, in this region, a continuous and converging course of the camber line is expected when the center points of the circles lie sufficiently near to one another, that is, when the staggering or separation of the geometric points being regarded is sufficiently fine. This definition serves for the determination of the leading edge and trailing edge particularly in the case of an unknown blade geometry, that is, not from the data on the blade geometry available from the design thereof. A straight line extending from the leading edge to the trailing edge is referred to as a blade chord.

For the determination of quantitative values, it is regarded as being sufficiently approximated when the position of the points of the corresponding blade value that are to be determined (axial extension, radial extension, peripheral extension) can be determined precisely to at least one one-hundredth of the extension of the blade in the corresponding direction in space. When there are indications that a finer staggering would be necessary or when the geometries being regarded approach very closely this description and the values cited in the claims, this approximation should be correspondingly refined.

Referred to as a maximum profile thickness of a profile is the greatest possible circular diameter of a circle between the profile suction side and the profile pressure side, with the center point of this largest circle being arranged on the camber line.

A connecting surface to a rotor hub or to a rotor shroud or endwall is referred to as a blade root.

Because every effort is made to keep as small as possible eddies and accordingly losses in engines and to prevent and to distribute undesired stresses in the material of the blades and of the hub, which is also referred to as the endwall or inner endwall, so that the undesired stresses do not pose a detriment, the transitions from the blade to the rotor hub in the region of the blade root are designed to be continuous—through the provision of a fillet. This results in the creation of geometries deviating from the aerodynamically ideal or optimized blade profile, so that the exact position of the leading edge and trailing edge can no longer be determined unequivocally by the above-described approach, since the circular shapes of the blade ends at the leading edge and at the trailing edge are disrupted by the presence of a fillet, that is, by a shape of the blade that deviates from an aerodynamically optimized shape. This is aggravated by the fact that the blade profiles calculated during the design of the blade are not defined along a cylindrical peripheral plane, but rather can intersect said plane. Furthermore, in the region of the blade root, the hub or endwall contouring of the main rotor body may be adapted to the flow, which, in turn, makes it difficult to locate the beginning of the fillet.

In the determination of the values of such a blade that is to be measured, in particular of a connecting structure, such as a fillet, the surfaces of the blade and of the endwall as well as of the transition between the blade and the endwall are measured optically, for example. The exact position of the leading edge and trailing edge, the exact connecting region from the aerodynamically ideal profile onto a fillet, and the connecting region from the fillet onto the rotor hub can nonetheless be determined only with difficulty. Inner-lying values are, as a rule, not known and the transitions at the surface from the blade root onto the fillet and further onto the hub are continuous on account of the aerodynamic shape of the blade; that is, a precise transition point can likewise be determined only with difficulty without a knowledge of the flow and the design point of the blades.

In order to make it possible to determine the quantitative values of blades to be measured when the aerodynamic relationships and the design considerations are not initially known adequately in good approximation, sections that lie in one of the main planes are made through the blade, with a staggering of the distances occurring for approximative determination of the geometries in question along the three main axes in each case by at least one one-hundredth of the greatest longitudinal extension of the blade, of the greatest radial extension of the blade, and of the greatest peripheral extension of the blade. In other words, a lattice (analogous to a lattice in a finite element method, abbreviated FEM) with a fineness of at least one hundred steps in each case in all three main directions, namely, between the frontmost and rearmost point of the blade, between the points of the blade lying furthest inward and outward, and between the points of the blade lying furthest apart in the peripheral direction, is laid down.

The greatest peripheral and axial extensions of the blade are to be expected at the hub, because the connecting region from the blade root to the main rotor body occurs there and the blade root has the greatest extension.

In order to determine the axial beginning and the axial end, that is, the connecting points, of the blade root in the axial direction, the contour of the surface in the region of the hub needs to be taken into consideration. If a depression is present in the axial direction or opposite to the axial direction adjoining the connecting region, then the connecting point of the blade root on the hub will be a point of inflection of the surface. If an elevation is present in the axial direction or opposite to the axial direction, then the connecting point will be a minimum radial distance of the surface to the axis of rotation of the rotor. If an extension with a linear course is present in the plane in question, then the connecting point is defined by a beginning of a curvature.

In order to determine the beginning of the periphery or the end of the periphery of the blade root in the peripheral direction, the contour of the surface in the region of the hub needs to be taken into consideration. A transition from the surface of the hub to a connecting structure, such as, for example, a fillet, can be expected in a region in which the curvature of the surface changes. If a depression is present in the peripheral direction or opposite to the peripheral direction adjoining the expected region in which the transition is to be found, then the transition point of the blade root to the hub will be a point of inflection of the surface. If an elevation is present in the peripheral direction or opposite to the peripheral direction, then the transition point will be a minimum radial distance of the surface to the axis of rotation. If, in the plane in question, an extension with a linear course is present, then the transition point will be defined by a beginning of a curvature.

The axial beginning and the axial end of the blade root as well as the beginning of the periphery and the end of the periphery of the blade root are points that are each at a radial distance to the axis of rotation of the turbomachine. Via those ones of these points with the shortest radial distance, it is possible to define a peripheral plane as a cylindrical outer surface, which, in the following, defines an auxiliary end wall of the hub and serves as a starting point for determining the radial extension of the blade and thus also the maximum radial extension to a first approximation.

The greatest radial extension of the blade element can then be created alternatively by formation of another cylinder around the axis of rotation of the engine, the outer surface of which intersects only a single point of the blade, namely, the outermost point of the blade.

From this maximum extension, it is possible to derive the staggerings or lattices for the determination of all values of the blade, as presented above, in particular lattices whose edge lengths are each one one-hundredth or less of the maximum longitudinal, radial, and peripheral extensions of the blade.

In order to determine a connecting point of the blade element on a connecting structure—such as, for example, a fillet with or without a crack-affecting device—of the blade element on the endwall when the flow relationships are not known or when the underlying structural-mechanical considerations are not known, the blade is enclosed, as described above, in a lattice subdivision of the meridional planes, the cross-sectional planes, and the peripheral planes. For the determination of the connecting points of the blade element to the connecting structure to a first approximation, those points of the blade surface in the region in which the beginning of the connecting structure is expected are determined, said points having a greater change in curvature in comparison to at least one radially outer and inner neighboring point regarded along the surface. For the determination of the connecting points of the connecting structure on the endwall, an analogous procedure is followed, whereby, in this case, both the neighboring points in the axial direction and the neighboring points in the peripheral direction on the surface of the blade are taken for comparison of the change in curvature.

After determination of the connecting regions, the measured surfaces as well as the beginning and end of the connecting structure in the radial direction should be known.

In the respective peripheral plane of the leading edge and of the trailing edge, it is possible to create an extension line, which may also be referred to as an extrusion line, of the straight lines employed for determining the leading edge or trailing edge. From this extension line, it is possible to project a line onto the connecting structure in the radial direction up to the blade root, whereby, in the following, said line is supposed to serve as a leading edge or trailing edge on the connecting structure. In cases in which, on account of a geometric delimitation of the disk, the blades and the connecting structures thereof are intersected in the axial direction, there can be two leading edges or trailing edges in this region, the corresponding other values of which for describing the connecting structure are to be determined. Along each of the connecting regions, it is possible to place, in each case, at least one hundred lattice points between the leading edge and the trailing edge, with two opposite-lying points of the two connecting regions arranged on either the suction side or the pressure side being connected along the measured surface, so that a correspondingly fine subdivision of the connecting structure is made possible. It is possible to determine from this the extensions of the regions of the connecting structures described in this application and of the variants thereof at least to a first approximation.

In the above-described method for determining the values and positions, first approximation methods are involved in order to be able to classify an unknown blade. If required, a check should be performed in a further step insofar as possible on the basis of the exact geometry and the knowledge of the connections. More exact results are afforded by taking actual values from, for example, design blueprints.

Described in WO 2012/055881 A1 is a coating that is made up of a plurality of individual layers for affecting crack behavior, said individual layers comprising a ceramic main layer and a quasi-ductile, but not metallic, intermediate layer, with pores, material inclusions, or microcracks that lead to the deflection of any cracks that are forming.

Known from U.S. Pat. No. 9,920,633 B2 is a compound fillet, that is, a fillet with two different radii, which transition into each other tangentially. A drawback thereof is that a crack cannot be influenced by this structure.

SUMMARY OF THE INVENTION

The object of the present invention is to better limit crack growth in the blades and rotors of turbomachines. Another object of the invention is to make available a turbomachine with at least one such blade or at least one such rotor with a reduced potential for crack growth.

The objects are achieved in accordance with the blade, rotor and turbomachine in accordance with the present invention. Especially advantageous embodiments with appropriate enhancements of the invention are discussed in detail herein, with advantageous embodiments of each aspect of the invention to be regarded as advantageous embodiments of each of the other aspects of the invention.

A first aspect of the invention relates to a blade for a turbomachine, such as, for example, for an aircraft engine. The blade comprises a blade element with a suction side and a pressure side, which extend between a leading edge and a trailing edge of the blade element, as well as a blade root for connection of the blade to a main rotor body. A reduction in the crack growth potential is achieved in accordance with the invention in that the blade comprises a crack-affecting device, in particular a crack-directing device and/or a crack-retarding device, which, in at least the radial direction, has an altered cross-sectional geometry in comparison to an aerodynamically optimized blade profile. Both a crack-directing device and a crack-retarding device influence the crack growth potential, so that, at least under certain circumstances, these terms can also be used synonymously. The crack-affecting device may also be referred to as a crack-affecting fillet, since the crack-affecting device is arranged, in particular, at the blade root and is formed from a standard fillet or else replaces or supplements a standard fillet and thus forms at least a part of a connecting structure of the blade element at a rotor endwall. It is self-evident that a crack-affecting device can also always be a crack-directing device in the sense that the course of the crack is guided or controlled or the speed of spread thereof is directed. In other words, in accordance with the invention, it is provided that the growth of a possibly occurring crack in the blade element is prevented or retarded by the crack-affecting device in the form of a preferably abrupt positive change in the cross section of the blade in at least the radial direction, because, on account of the change in the cross section, the crack-affecting device leads to a local jump in stiffness and thus directs the spread of the crack away from the disk and/or retards or stops the spread of the crack in the direction toward the disk or in the radial direction. The special geometric design of the crack-affecting device can deliberately influence the mean stress as well as the vibrational stresses in the transition region between the blade and the blade root or, in the mounted or joined state of the blade, the vibrational stresses in the transition region between the blade and the main rotor body connected to it. The high mean peripheral stresses in the main rotor body occurring during the operation of a turbomachine can be separated advantageously from the high vibrational stresses in the blade element by use of the crack-affecting device. In this way, the jump in stiffness due to the crack-affecting device influences the direction of spread and/or the speed of spread of a crack originating in the blade element or in the region of the blade root or in the transition region to a main rotor body. In the case of a spread of the crack, either the crack growth potential is limited or, in the event of failure, only the blade is separated from the main rotor body. In this way, it is prevented that a crack can grow from the blade into the main rotor body. In general, "a/an" is to be read in the scope of this disclosure as being an indefinite article, that is, unless otherwise stated, always also as "at least one." Conversely, "a/an" can also be understood to mean "only one."

In an advantageous embodiment of the invention, it is provided that the crack-affecting device comprises at least one depression that extends partially or completely around the blade element in the axial direction. The depression is a first profile region of the crack-affecting device. Such a depression, which may also be referred to as a notch, a groove, or a negative change in the cross section, creates, on the one hand, a desired fracture site in the blade element, by way of which a crack growth into a main rotor body is effectively prevented, and, on the other hand, reduces advantageously the vibrational stresses occurring during operation in the adjoining component regions. The depression can fundamentally extend along 10%, 15%, 20%, 25%, 30%, 35%, 40%, 45%, 50%, 55%, 60%, 65%, 70%, 75%, 80%, 85%, 90%, 95%, or 100% of the total extent of the blade element in the region in question, with corresponding intermediate values, such as, for example, 50%, 51%, 52%, 53%, 54%, 55%, 56%, 57%, 58%, 59%, 60%, etc. to be regarded as being disclosed as well. The depression can fundamentally have a constant or a variable distance to the blade root. It is also possible to provide two or more depressions of this kind, as a result of which an intended desired fracture behavior can be adjusted especially exactly.

In another advantageous embodiment of the invention, it is provided that, along its axial extension, the depression has a constant or variable cross-sectional geometry, in particular a constant or variable radial height and/or a constant or variable maximum depth. This allows an especially precise adjustment of the stiffness, the vibrational behavior, and the crack growth potential.

Further advantages in regard to an advantageous crack growth potential ensue in that the depression is arranged radially above a fillet that is formed in the connecting region of the blade element at the blade root. A fillet is understood to mean roundings between the blade root or a radially inner or bottom endwall and the blade element, which, in this radially connecting or transition region of the blade element to the blade root, serve for the reduction of stress. In the scope of the present disclosure, "radially outer" or "radially above" is understood fundamentally to mean a direction toward a blade tip and "radially inner" or "radially below" is understood to mean a direction toward the blade root. Accordingly, "radially above" means that the element in question lies nearer in direction to the blade tip, whereas "radially below" means that the element in question lies nearer in direction to the blade root. The terms "radially" and "axially" fundamentally refer to an axis of rotation of a rotor of a turbomachine, which is furnished with the blade according to the invention in accordance with its intended use. In accordance therewith, the peripheral direction is also used herein in reference to the axis of rotation of the turbomachine.

In another advantageous embodiment of the invention, it is provided that the crack-affecting device comprises a pedestal, with the pedestal being arranged between the blade element and the blade root and having a larger cross-sectional thickness than does the blade element. In other words, it is provided that the crack-affecting device has a pedestal region that is thicker in cross section in comparison to the blade element, that is, is furnished with a positive change in the cross section on which the blade element is arranged. Another description of the pedestal region can be the thickening provided in comparison to an aerodynamically ideal blade element, which is used in the following for reasons of simplicity. In other words, it is provided that the crack-affecting device comprises at least one rounding that is formed radially above a fillet created in the connecting region of the blade element at the blade root. Provided is a kind of "double fillet" in that, in addition to the fillet in the connecting region of the blade element at the radially inner endwall, at least one other rounding, that is, another profile region, which may also be referred to as an additional fillet with a positive change in the cross section, is provided radially above the fillet. In this way, a spread of the crack, in particular in the direction of the blade root or radially downward, can be suppressed especially reliably. By way of such a "positive" jump in stiffness on account of the material thickening, it is possible to stop or to retard any occurring cracks especially reliably and to strongly reduce vibrational stresses. In addition, it is possible to achieve, at least to a great extent, a separation of peripheral and vibrational stresses. In this way, it is further provided that, in the radial direction, the pedestal comprises at least two profile regions that adjoin each other and differ from each other. In other words, the pedestal comprises at least two profile regions that are strung together in the radial direction and have different geometries. This allows an especially precise adjustment of the course of the radial stiffness. The profile transition region defines, at the same time, an outer edge, in particular a rounded outer edge, of the pedestal of the crack-directing device, whereby the first profile region adjoining the blade element defines a pedestal thickness in the peripheral direction, whereas the second profile region adjoining the main rotor body defines a pedestal height in the radial direction. The designations are chosen in this way because, on the one hand, a change in the course of the curve is adjusted between the profile transition region and the first profile region, said change in the course of the curve representing, as viewed in a cross-sectional plane, an identifiable point, in particular, a point of inflection ("pedestal thickness point"), so that the term "pedestal thickness," as measured from the blade element, in particular from the aerodynamically optimized blade element, up to this point, seems to be appropriate. On the other hand, the term "pedestal height" is correspondingly chosen, because a change in the course of the curve is adjusted between the profile transition region and the second profile region, said change in the course of the curve representing, as viewed in a cross-sectional plane of the engine, an identifiable point of inflection ("pedestal height point"), so that the term "pedestal height," measured from the endwall up to this point, likewise appears to be appropriate. If these two points, namely, the pedestal thickness point and the pedestal height point, coincide and, in the case that the two profile regions are concave in form, there results a sharp edge, which, as a rule, is not permitted in aviation, so that the profile transition region preferably has an outward arched, convex contour or rounding. Advantageously, the rounding has a radius between 0.5 and 2.5% of the blade height. Also conceivable is a chamfer (in turn, with rounded edges). Through the design of this transition region, it is also possible to influence a crack. In particular, the rounding or the chamfer can be as precipitous or abrupt as possible in form. It is preferably provided here that the pedestal thickness has a variable course in the axial direction. Furthermore, the blade can advantageously be formed in such a way that the pedestal height has a variable course in the axial direction. The crack-affecting device can further be designed in such a way that the pedestal thickness and/or the pedestal height has or have a different course on the suction side than does the pedestal thickness on the pressure side.

In particular, through the choice of the position of the profile transition region between the at least two profile regions, it is possible to separate a mean peripheral stress from a vibrational stress of the blade. Regions of increased centrifugal force load often occur centrally, as viewed in the peripheral direction, in a transition region between the blade element and the main rotor body, whereas the vibrational stress occurs at the outer contours, in particular at contour transitions.

In a preferred embodiment of the blade according to the invention, it is provided that two mutually adjoining profile regions of the at least two profile regions have a transition angle of between 0° and 180°, preferably between 30° and 150°, more preferably between 60° and 120°, and most preferably between 75° and 105°. Through the transition, in particular the non-tangential transition between the two profile regions, it is possible to create an effective crack-affecting device. Furthermore, it is also possible in this way to design the profile transition region in an especially simple way. Beyond this, it can be provided that the transition angle varies along the extension of the crack-affecting device around the blade.

It has therefore been shown that, when there is present a ratio of the pedestal thickness to the maximum blade thickness that lies in the range of 15 to 150, in particular in the range of 20 to 100, most preferably in the range of 25 to 75, an advantageous minimum distance is adjusted between the profile transition region and the blade root, and this influences, that is, retards or prevents especially advantageously any crack spread in the direction toward the disk.

Furthermore, it has been shown that, advantageously, there is present a ratio of the pedestal thickness to the maximum peripheral extension of the blade root that lies in the range of 1% to 10%, in particular in the range of 2% to 9%, most preferably in the range of 3% to 8%. In this way, any spread of the crack in the direction of the disk can be retarded and, in general, the direction of an occurring rack can be influenced favorably in the connecting region.

Furthermore, it can advantageously be provided that a ratio of the pedestal height to the maximum blade thickness lies in the range of 4 to 60, advantageously in the range of 6 to 40, and most preferably in the range of 8 to 30. The ratio can be differently manifested on the suction and on the pressure side. The maximum blade thickness can be measured directly above the crack-affecting device in a simple way, but, for better accuracy, given a knowledge of the aerodynamically optimized blade element, it should be determined in the peripheral plane with the radial position of the pedestal height point.

In another preferred enhancement, it is provided that a ratio of the blade chord length to a maximum pedestal height lies in the range of 2 to 60, advantageously in the range of 4 to 40, and most preferably in the range of 6 to 20. The maximum pedestal height is the greatest pedestal height of all cross sections through the blade.

Another preferred embodiment is designed in such a way that the crack-affecting device has at least two profile regions and that at least a first profile region of the at least two profile regions extends around the blade from a leading edge of a blade to a trailing edge of the blade, at least in part, so that a full region and a terminating region and, under certain circumstances, a free region are formed. The full region is characterized in that the crack-affecting device is formed completely. In the free region, no crack-affecting device is formed; in other words, in the free region, for example, only a standard fillet is formed. In the terminating region, the crack-affecting device transitions into or runs out in the standard fillet.

In the terminating region, the pedestal thickness and/or the pedestal height can advantageously approach zero or can be zero, as a result of which, in a simple way, the precipitousness or the flatness of the two profile regions and also of the transition region can advantageously be adjusted, so that the spread of the crack can be influenced even more in a targeted manner.

The blade can advantageously be further developed in such a way that at least one first profile region of the at least two profile regions extends around the blade in the flow direction at least in part. The at least first profile region can fundamentally extend along 10%, 15%, 20%, 25%, 30%, 35%, 40%, 45%, 50%, 55%, 60%, 65%, 70%, 75%, 80%, 85%, 90%, 95%, or 100% of the total extent of the blade element in the region in question, with corresponding intermediate values, such as, for example, 50%, 51%, 52%, 53%, 54%, 55%, 56%, 57%, 58%, 59%, 60%, etc. to be regarded as being disclosed as well. The first profile region can fundamentally have a constant or variable distance to the blade root. Two or more profile regions of this kind can also be provided, as a result of which an intended desired fracture behavior can be adjusted especially exactly.

An especially reliable prevention of a spread of the crack is made possible in another embodiment in that the at least two profile regions have different concave and/or convex radii or different concavely and/or convexly curved surfaces and/or that the at least two profile regions are arranged so as to adjoin each other continuously and/or discontinuously or so as to be separated from each other. This also allows an especially extensive separation of the peripheral stresses and the vibrational stresses in the blade. In particular, it can be provided that the radii and/or the surfaces on the pressure side differ in shape from the radii on the suction side. In an advantageous way, it is thereby possible in the design of the blade to take into consideration an axial course of at least one of the values composed of the angle of pitch, the angle of inflow, the angle of outflow, the stagger angle, and of other angles of the blade element that deviate from a radial axis. Through the use of radii as the values defining the pedestal and the fillet, an especially simple fabrication of the blades by corresponding milling tools is possible. Curved surfaces have the advantage that they can be adapted very exactly to the predicted stresses in order to influence the spread of the crack.

Further advantages ensue in that the at least one rounding of the crack-affecting device directly abuts the fillet that is formed in the connecting region of the blade element at the blade root or is radially spaced apart from the fillet that is formed in the connecting region of the blade element at the blade root. In other words, the two or more fillets directly adjoin each other in the radial direction or, for example, are separated from each other by a pedestal or a region with an aerodynamically optimized cross section. This allows a high degree of design freedom and allows an aerodynamic optimization of the crack-affecting device.

In another advantageous embodiment of the invention, it is provided that the crack-affecting device has continuous transition regions in adjoining blade regions. By way of this adaption of the adjoining geometries at the crack-affecting device, the creation of abrupt flow-stalling edges is prevented.

In another advantageous embodiment of the invention, it is provided that the crack-affecting device comprises at least one depression extending in the axial direction in a radially inner endwall. In other words, in the region of its blade root, the blade has a depression extending in the direction of an axis of rotation, that is, between an upstream and a downstream end region of the blade, which may also be referred to as a recess, a trench, or a channel. It is possible in this way, too, to achieve an advantageous separation of the peripheral stresses and the vibrational stresses and to prevent any spread of the crack. The width, depth, and axial extension of the depression can be adapted individually to the respective type of blade. Preferably, the depression extends over the entire axial length of the blade root and, in this case, too, adjoining geometries are preferably aerodynamically adapted so as to allow no abrupt flow-stalling edges to be created. Fundamentally, it can also be provided that two blades that are to be arranged next to each other have depressions that correspond to or are complementary to each other.

Further advantages ensue in that the crack-affecting device comprises depressions in the radially inner endwall that extend on both sides of the blade element in the axial direction. In other words, the blade has both a pressure-side depression and a suction-side depression in the endwall. This leads to a further improvement of the crack behavior and of the aerodynamic properties.

A second aspect of the invention relates to a blisk or to a rotor constructed as a blisk for a turbomachine, comprising at least one blade in accordance with the first aspect of the invention, which is coupled to a main rotor body. In this way, the crack growth potential of the rotor is reduced in accordance with the invention, because, based on its change in cross section, the crack-affecting device of the blade leads to a local jump in stiffness, which prevents or renders impossible any growth or spread of a crack. Preferably, two blades, a plurality of blades, or all blades of the rotor are formed in accordance with the first aspect of the invention. Further features and the advantages ensuing from them may be taken from the descriptions of the first aspect of the invention.

A third aspect of the invention relates to a turbomachine, in particular, an aircraft engine, comprising at least one blade in accordance with the first aspect of the invention, and/or at least one rotor in accordance with the second aspect of the invention. In this way, a reduced crack growth potential of the blade or of the rotor is achieved. Further features and the advantages ensuing therefrom may be taken from the descriptions of the first and of the second aspect of the invention.

The invention further relates to a method for producing a blade with a crack-directing device at a rotor disk, wherein the blade has a crack-directing device between a root of a blade element and a main rotor body, wherein the crack-directing device has a first profile region adjoining the blade element, wherein the crack-directing device has a second profile region adjoining the rotor disk, wherein, for creation of the first profile region, a first milling tool with a first diameter is used, and wherein, for creation of the second profile region, preferably also the first milling tool or else a second milling tool with a second diameter differing from the first diameter is used. In this way, it is advantageously possible in a simple and cost-effective way, to produce a crack-directing device at a blade of a rotor disk or at a blade of a blisk. Through the use of a single milling tool, it is possible to eliminate processing steps. Through the use of two milling tools, it is easily possible to post-process blanks of blisks that are present in forged or cast form. In particular, it is possible in this way to precisely produce a crack-directing device, with it being possible, in particular, to adjust the surface characteristics to the flow. In addition, a profile transition region can be produced in this way, in particular by using the first milling tool or the second milling tool. The profile transition region can be post-processed in a subsequent step by another milling tool, in particular in such a way that a spread of the crack occurs more strongly in the flow direction than in the radial direction. The blade, the main rotor body, and the crack-directing device can be forged and/or cast prior to the milling already in a first step, so that, advantageously, only a slight post-processing using the milling steps is still necessary for the creation of the precise surface structures of the crack-directing device.

Specific aspects of the invention, in particular the curvature of the surfaces of the profile regions presented above, can be described in such a way that, between a blade root and a blade element, a concave curved surface, such as, for example, a radius or a spline, is characterized, the connecting points of which extend tangentially, that is, continuously, to the outer contour from the blade element and the blade root. The crack-directing device can then be defined via one or a plurality of maximum values of a distance between this curved surface and an overall outer contour of the crack-directing device.

Furthermore, specific aspects of the invention, in particular of the profile transition region between the profile regions, can be described in that, in the profile transition region (in a section perpendicular to the longitudinal extension of the blade), an imaginary extension line of the curves resulting from the profile surfaces is laid down in each case at the sites of the points of inflection, with the two extension lines crossing outside of the profile transition region. In this case, the points of inflection are the connecting points at the profile transition region between the two profile regions. The two extension lines of the surface curves of the first profile region and of the second profile region then span a sectional angle that lies in a range of 0° to 180°. In particular, the sectional angle can vary along the longitudinal extension of the blade. Preferably, the sectional angle has a maximum in a fully formed profile region and then decreases preferably continuously up to a free region in a terminating region. A plurality of local maxima of the sectional angle can also be present.

In a special embodiment, a coating that further influences the spread of the crack can be applied onto at least one of the profile regions of the crack-affecting device. The coating can be produced from a different material than that of the crack-affecting device lying below it. The coating can have pores, material inclusions, or microcracks, so that the spread of the crack is influenced.

BRIEF DESCRIPTION OF THE DRAWING FIGURES

Further features of the invention ensue from the claims, the figures, and the description of the figures. The features and combinations of features mentioned above as well as the features and combination of features mentioned below in the description of the figures and/or shown in the figures alone can be used not only in the respectively presented combination, but also in other combinations, without leaving the scope of the invention. Accordingly, embodiments of the invention that are not explicitly shown and explained in the figures, but that ensue from and can be produced by separate combinations of features from the embodiments explained, are also to be regarded as being comprised in and disclosed by the invention. Embodiments and combinations of features that thus to do not have all of the features of an originally formulated claim are also to regarded as being disclosed. Beyond this, embodiments and combinations of features that go beyond combinations of features presented in reference back to the claims or that depart from them are to be regarded as being disclosed, in particular by the embodiments explained above. Shown herein:

Figure 6A:
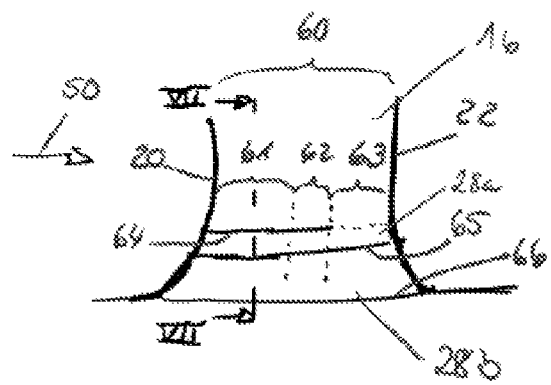
FIG. 6a is a schematic side view of a fourth exemplary embodiment of a blade according to the invention.
Figure 7:
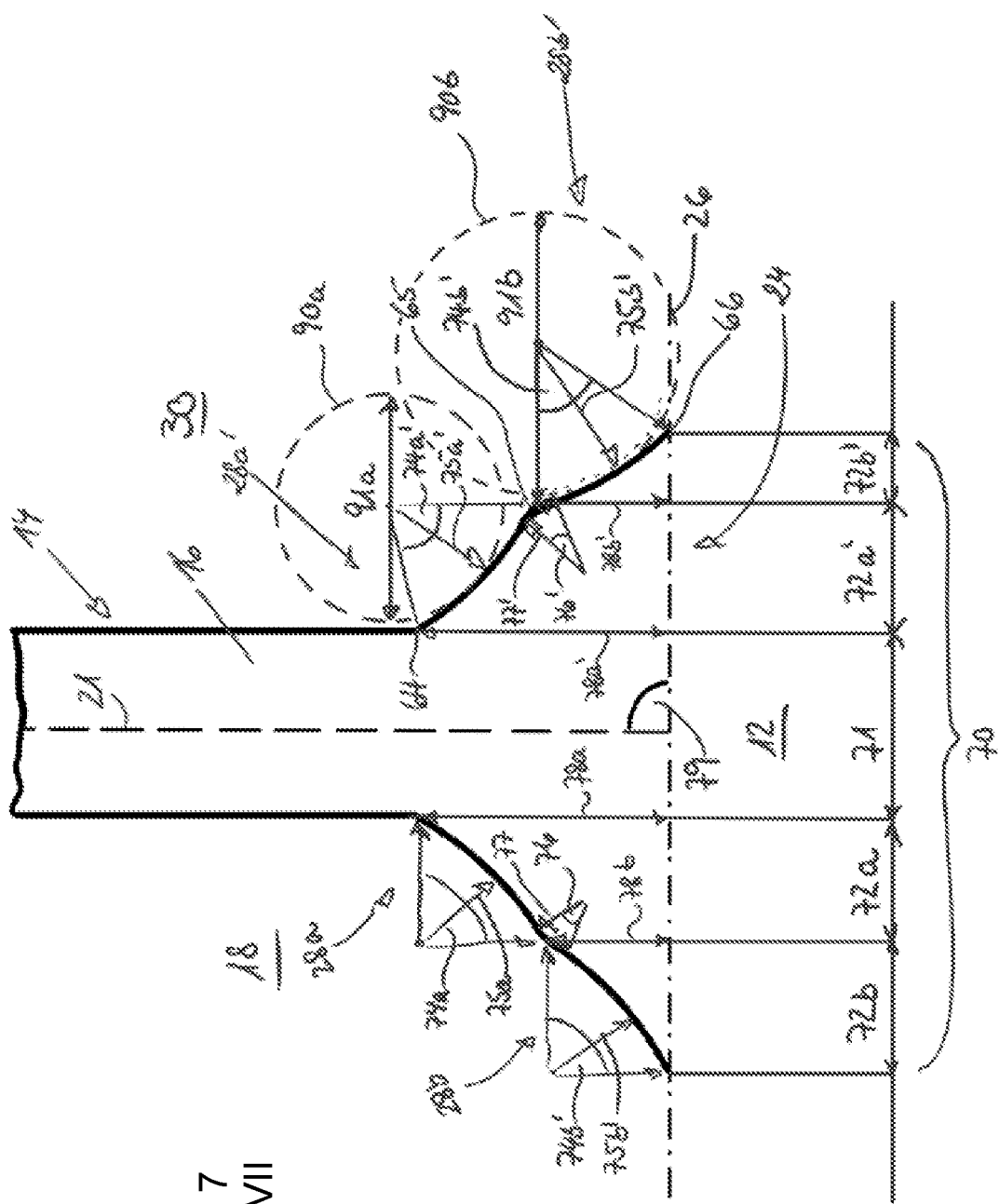
Figure 8A:
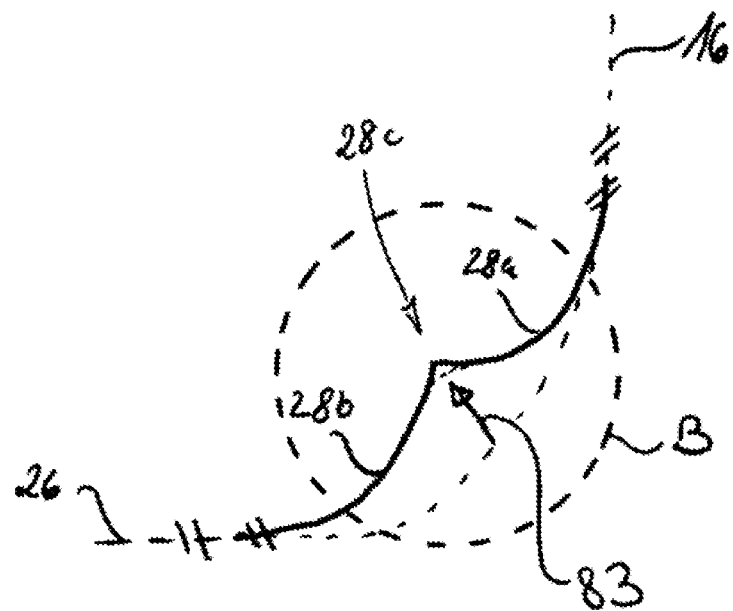
Figure 8B:
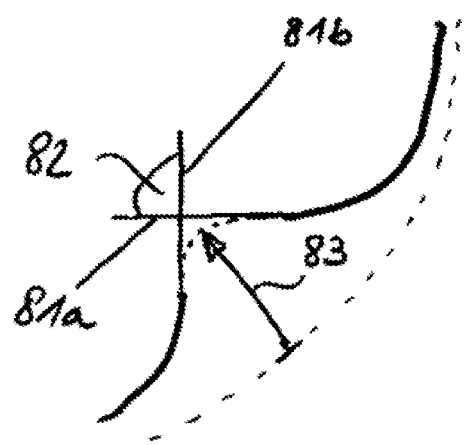

FIG. 6b-f are different variants of the fourth exemplary embodiment in accordance with FIG. 6a;

FIG. 7 is a cross section through the blade according to the invention in accordance with FIG. 6a;

FIG. 8a is a cross section through a crack-affecting device of a blade according to the invention; and FIG. 8b is an enlargement of the cross section from FIG. 8a.

DESCRIPTION OF THE INVENTION

Figure 1:
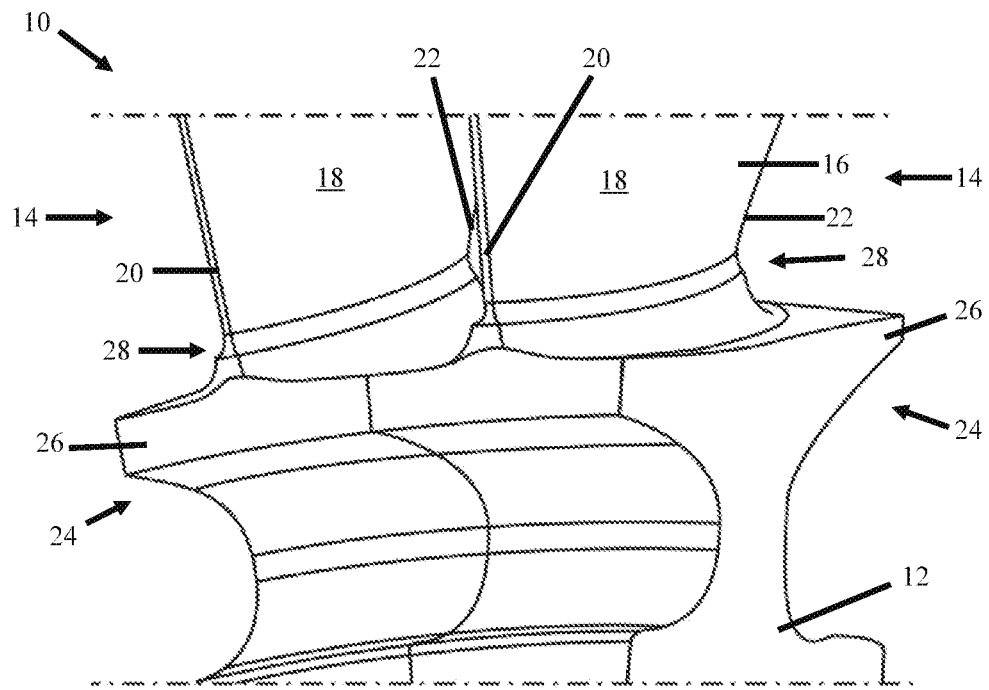
FIG. 1 is a schematic and excerpted perspective view of a rotor according to the invention in accordance with a first exemplary embodiment.

FIG. 1 shows a schematic and excerpted perspective view of a rotor 10 according to the invention in accordance with a first exemplary embodiment. In the present case, the rotor 10 is designed as a blisk (bladed disk) for an aircraft engine and comprises a disk-shaped main rotor body 12, which is integrally furnished with blades 14. In FIG. 1, by way of example, a rotor segment with two blades 14 is illustrated, with the blades 14 being identical in form in the present case. Two or more blades 14 can fundamentally be different in form and/or can be combined to form a blade cluster. Each blade 14 comprises a blade element 16 with a suction side 18 and an opposite-lying pressure side 30 (see FIG. 2), which extend between a leading edge 20 and a trailing edge 22 of the blade element 16. Furthermore, each blade 14 comprises a blade root 24, by way of which the respective blade 14 is connected to the main rotor body 12. In the exemplary embodiment shown, each blade root 24 of the blade 14 comprises, in addition, a radially inner endwall 26, which, in the mounted state of the rotor 10 in the aircraft engine, bounds a fluid path of an operating fluid. Fundamentally, each blade 14 can also have a radially outer endwall (not shown).

In order to prevent any growth of cracks into the disk of possibly occurring cracks in the blade elements 16, each blade 14 has a crack-affecting device 28, which, in the present case, is designed as a pedestal, with the pedestal being arranged between the blade element 16 and the blade root 24 or the endwall 26 and, in the radial direction, has a thickened cross-sectional geometry in comparison to an aerodynamically optimized blade profile. This special geometric design of the crack-affecting device 28 influences the mean stress as well as the vibrational stress in the transition region between the blade 14 and the main rotor body 12. Accordingly, the high mean peripheral stresses in the main rotor body 12 are separated from the high vibrational stresses in the blade elements 16. In this way, the jump in stiffness due to the crack-affecting device 28 influences the direction of spread of a crack originating in the blade element 16 or in the transition region to the main rotor body 12. In the course of the spread of the crack, either the crack growth is potentially expanded or, in the case of failure, only the blade 14 or the blade element 16 is cleaved. Accordingly, the crack can no longer grow from the blade 14 into the main rotor body 12.

Figure 2:
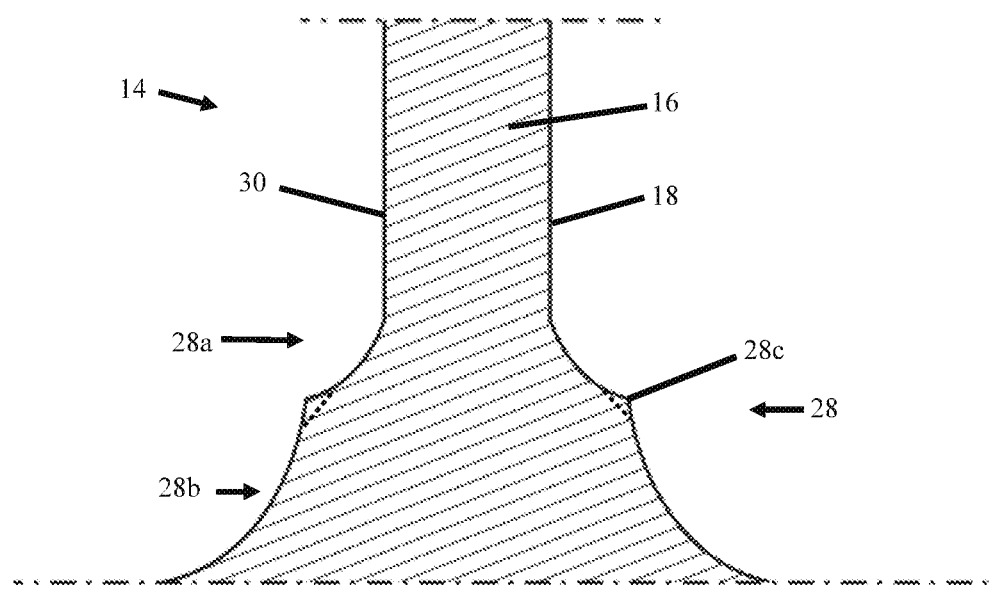
FIG. 2 is a schematic frontal sectional view of one of the blades shown in FIG. 1 in the region of a crack-affecting device.

FIG. 2 shows a schematic frontal sectional view of one of the blades 14 in FIG. 1 shown in the region of their crack-affecting device 28. It can be seen that, in the radial direction, the crack-affecting device 28 comprises two profile regions 28a, 28b that adjoin each other and are different in form, the cross-sectional thickness of which is greater than the cross-sectional thickness of the blade element 16 in the adjoining region. In the present case, the two profile regions 28a, 28b have different concave radii and abut each other discontinuously in a transition region 28c. Through this radial and axial distribution of stiffness, it is possible to separate peripheral stresses and vibrational stresses especially effectively. The profile regions 28a, 28b may also fundamentally be referred to as a fillet, as a result of which, in the present case, a kind of "double fillet" is obtained. It is self-evident that, in the transition region 28c, a radius or a chamfer can also be arranged in order to influence even more exactly possible surface stresses and thus to achieve a compromise that is as ideal as possible between a directing a crack, the aerodynamics of the component, and the strength of the component. A chamfer is indicated in FIG. 2 in the transition region 28c, by way of example, as a dashed line.

Figure 3:
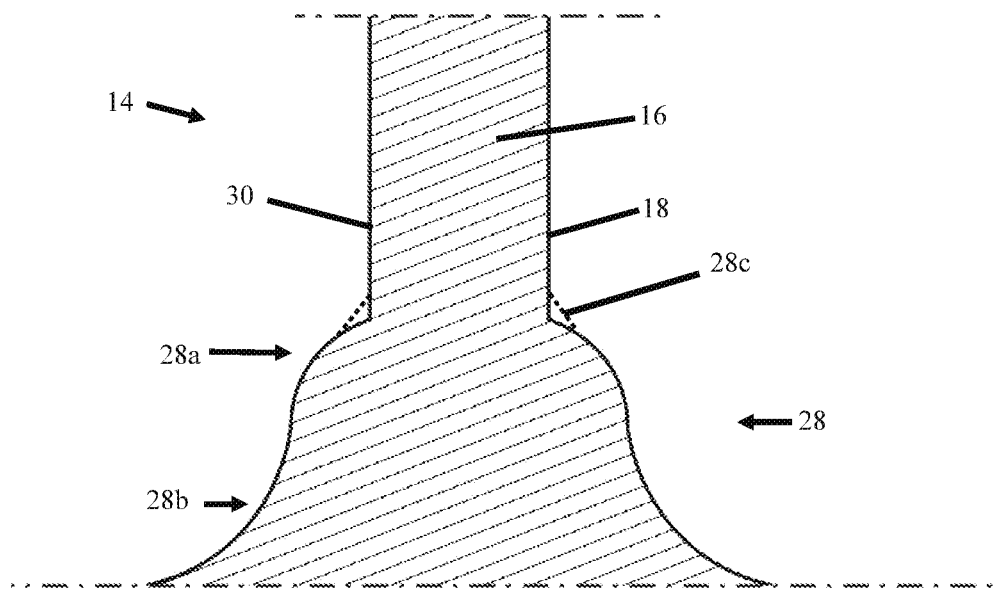
FIG. 3 is a schematic frontal sectional view of a blade in accordance with a further exemplary embodiment.

FIG. 3 shows a schematic frontal sectional view of a blade 14 in accordance with another exemplary embodiment. In contrast to the preceding example, the crack-affecting device 28 has two profile regions 28a, 28b that are adjoined to each other and differ in form in the radial direction, with the profile region 28a having a convex curved surface, in particular a convex radius, and the profile region 28b having a concavely curved surface, in particular a concave radius. In addition, both profile regions 28a, 28b abut each other continuously. In general, the profile regions 28a, 28b can be provided with two or more concavely and/or convexly curved surfaces, in particular radii, which, via transition regions 28c, which, in the exemplary embodiment in accordance with FIG. 3, are illustrated as corners, adjoin each other or transition continuously into each other. It is self-evident that the transition regions 28c can also be formed by a radius or a chamfer or a free-form surface. The embodiment with a chamfer is indicated in the illustration by dashed lines.

Figure 4:
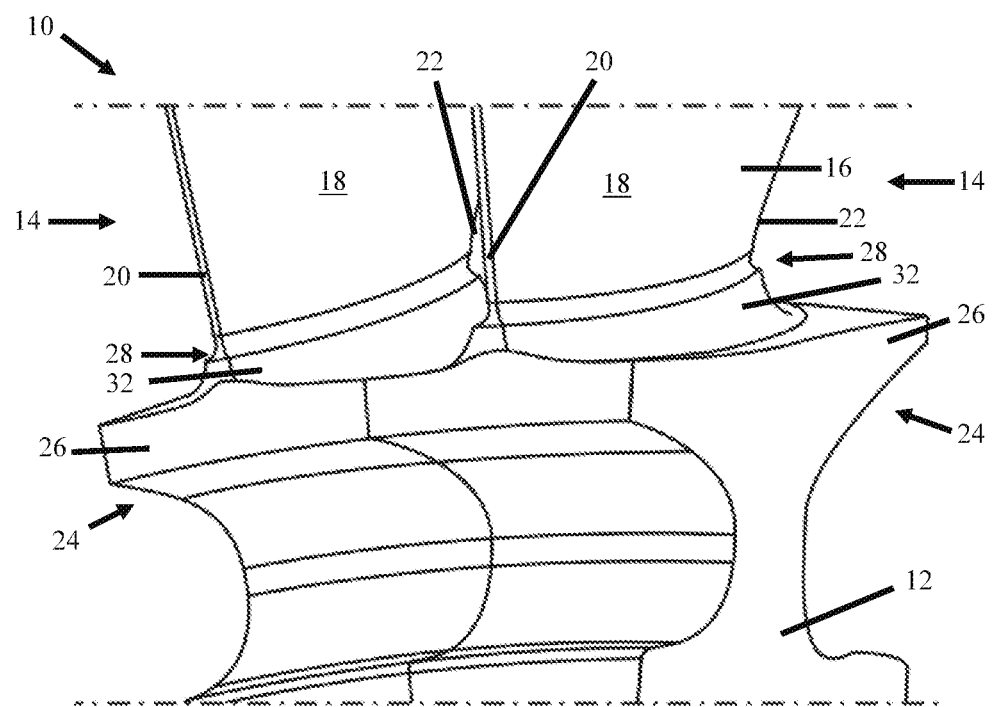
FIG. 4 is a schematic and excerpted perspective view of a rotor according to the invention in accordance with a second exemplary embodiment.

FIG. 4 shows a schematic and excerpted perspective view of a rotor 10 according to the invention in accordance with a second exemplary embodiment. The general construction of the rotor 10 is known from the preceding exemplary embodiment. In contrast to the first exemplary embodiment, the crack-affecting device 28 has a depression that extends completely in the axial direction around the blade element 16 and may also be referred to as a notch or a groove, the cross-sectional thickness of which is smaller than the cross-sectional thickness of the blade element 16 in the adjoining region. It can be seen that the depression is formed in the radial transition region from the blade root 24 or endwall 26 to the blade element 16. The concave depression or groove can fundamentally have a constant or variable radial height and/or maximum depth and forms a desired fracture site in the blade element 16. In addition, it contributes to reducing vibrational stresses in a radially underlying fillet 32 as well as in the radially underlying elements, namely, the endwall 26 and the blade root 24, and in the main rotor body 12.

Figure 5:
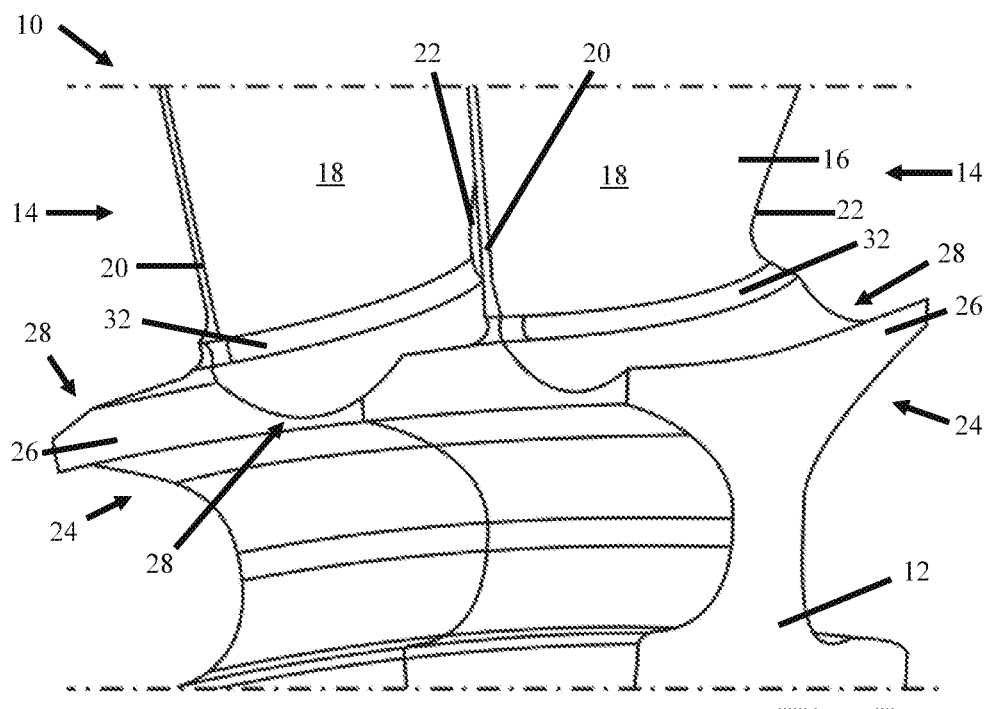
FIG. 5 is a schematic and excerpted perspective view of a rotor according to the invention in accordance with a third exemplary embodiment.

FIG. 5 shows a schematic and excerpted perspective view of a rotor 10 according to the invention in accordance with a third exemplary embodiment. Here, too, the fundamental construction is already known from the preceding descriptions. In contrast to the preceding exemplary embodiments, the crack-affecting device 28 of each blade 14 comprises depressions that extend on both sides of the blade element 16 in the axial direction in the radially inner endwall 26, with mutually adjoining depressions, which may also be referred to as trenches, being formed correspondingly by neighboring blades 14. The depressions also serve for the separation of peripheral stresses and vibrational stresses and, in regard to their geometry (width, maximum depth, axial extension, etc.) can be optimized for the respective applied case.

FIG. 6a shows a schematic side view of a blade element 16 of a rotor blade 14 of a rotor 10 in accordance with a fourth exemplary embodiment of the invention with a full region 61 of the first profile region 28a of the crack-affecting device 28 that extends only in part in the axial direction or in the flow direction 50, with, in the full region 61 of the first profile region 28*a*, a first profile of an at least partially concave curved profile surface being formed completely or at least being formed to 90%. In the exemplary embodiment shown, the second profile region 28*b* in the full region 61 is also formed completely or at least is formed to 90%. The characteristics of the profile surface are addressed in more detail in FIG. 7. Toward the front in the flow direction 50, that is, as viewed in the axial direction, the blade element has a leading edge 20 and, as viewed toward the rear in the flow direction 50, a trailing edge 22. In a central region of the blade element 16, there is a terminating region 62, in which the first profile region 28*a* transitions into a free region 63. In this case, the free region 63 corresponds essentially to a fluid-mechanically ideal shape of the blade element with a simple fillet that shifts the position of the outer contour of the blade element outward or, in other words, with a standard fillet that is nowadays generally in use. The first profile region 28*a* is no longer even manifested here, whereas, at least in the present exemplary embodiment, the second profile region 28*b* is still always manifested completely or to at least 90%, so that, a crack-affecting device 28 is no longer present in this region. The arrangement of the longitudinal extension 61 of the first profile region 28*a*, of the terminating region 62, and of the free region 63 can also extend here from the trailing edge 22 to the leading edge 20, as is shown in FIG. 6*d*, for example. It can also be provided that a plurality of terminating regions 62 and full regions 61 are arranged in alternation. Furthermore, it can be provided that, on account of a highest load that is only to be expected to occur in a central region, correspondingly a crack-affecting device 28 with a plurality of profile regions 28*a*, 28*b* is formed only at and beyond a specific axial extension. The course of the values describing the first profile region 28*a* and the second profile region 28*b* are explained in more detail further below on the basis of FIGS. 6*a* to 6*d* and FIG. 7. In the present case, both the first profile region 28*a* and the second profile region 28*b* have concavely curved surfaces, with the course of these surfaces occurring in a smooth manner from the two fully formed profile regions 61 by way of the transition region 62 to the free region 63, in which only one of the two profile regions is still formed.

Provided between the first profile region 28*a* and the blade element 16 is a first connecting region 64 in which the outer contours of the first profile region 28*a* and of the blade element 16 transition into each other as continuously as possible; that is, the outer contour of the first profile region 28*a* extends into the first connecting region 64 parallel to an outer contour of the blade element 16. In this way, it is prevented that a jump in stiffness already occurs along the common outer contour of the first profile region 28*a* and of the blade element 16. The first connecting region 64 is provided along the partially longitudinal extension 61 of the first profile region 28*a* and runs out in the terminating region 62 so as to finally entirely vanish in the free region 63 without profiling. It can be provided here (not illustrated) that the first connecting region 64 in the terminating region 62 transitions continuously into a profile transition region 65 and, in the free region 63, can no longer be differentiated from the profile transition region 65. The profile transition region 65 is situated between the first profile region 28*a* and the second profile region 28*b*. The profile transition region 65 is also formed as continuously as possible, wherein the profile transition region 65, in particular in the region 61 with the fully formed first profile 28*a*, has a convex arching. The first and the second profile regions 28*a*, 28*b* together form a double fillet.

A second connecting region 66 is formed between the second profile section 28*b* and the endwall 26 or the main rotor body 12. Wherein, the second connecting region 66 is a circumlocution for a transition from the second profile section 28*b* to the main rotor body 12 that is as tangential as possible.

Figure 6B:
Figure 6C:
Figure 6D:
Figure 6E:
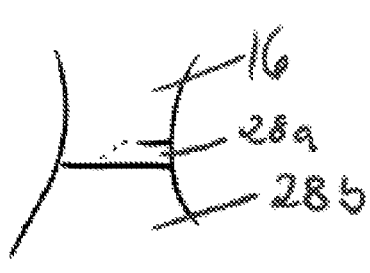

In FIGS. 6*b* to 6*e*, different courses of the first connecting region 64 and of the profile transition region 65 are shown. In FIG. 6*b*, the first connecting region 64 and the profile transition region 65 extend toward each other in the radial direction. In FIG. 6*c*, the first connecting region 64 extends especially along a profile section of the blade 14 or along an axial extension of the blade element 16, whereas the profile transition region 65 approaches the first connecting region 64 along the direction of flow in the radial direction and finally transitions into it. In FIG. 6*d*, the opposite behavior is observed; here, the profile transition region 65 extends exactly along a profile section, whereas the first connecting region 64 descends, as viewed in the radial direction, and approaches the profile transition region 64 and finally transitions into it. It can also be provided that either only the first connecting region 64 or the profile transition region 65 or both the first connecting region 64 and the profile transition region 65 is or are manifested variably entirely or in part along the terminating region 62 in the axial direction or changes or change their values described further below, so that a corresponding transition of the two regions 64, 65 into each other can occur.

Preferably, the region 61 of the fully manifested first profile region 28*a*, 28*a*' extends over at most 30%, preferably at most 40%, in particular, preferably at most 50%, more preferably at most 60%, and most preferably 70% of the axial extension of the blade. The terminating region 62 of the first profile region 28*a*, 28*a*' is adjoined to this and extends at least over a further 5%, preferably 10%, particularly preferred 15%, and further preferred 20% of the axial extension of the blade. In particular, for smaller regions of the fully formed first profile region 28*a*, 28*a*', longer terminating regions 62 may be appropriate, so that values of greater than 20%, that is, 25%, 30%, 35%, 40% 45%, or 50%, can result. It can be the case that no free region is provided.

Figure 6F:
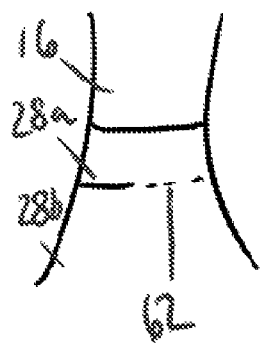

FIG. 6*f* shows, for completeness, a starting point and a course of the connecting region 62 differing from FIG. 6*a*, which, instead of connecting at the first connecting region 64, connects at the transition region 65 and, from there, defines the double fillet. The exemplary embodiments shown in FIGS. 6*b* to 6*e* can correspondingly be extended to or reflected in this embodiment.

FIG. 7 shows a sectional view along the section VII-VII of the embodiment shown in FIG. 6*a*. FIG. 7 shows a series of values that can fundamentally be employed also for the description of FIGS. 1 to 5. In the description, reference numbers that refer to an element on the pressure side are marked additionally by an apostrophe "'." The crack-directing device 28, comprising the first profile region 28*a* on the suction side 18, the second profile region 28*b* on the suction side 18, the first profile region 28*a*' on the pressure side 30, the second profile region 28*b*' on the pressure side 30, and the aerodynamically optimally formed blade element 16, has, in the peripheral direction. A common total width 70 at the second connecting region. In this case, the total width 70 in the peripheral direction is divided into the corresponding peripheral extensions 71, 72*a*, 72*b*, 72*a*', 72*b*' of the aforementioned components. The peripheral extension of the first profile region 28*a*, 28*a*' is hereby referred to as a pedestal thickness 72*a*, 72*a*' of the corresponding suction or pressure side. For reasons of simplicity, the present example relates to a blade without an angle of pitch or with an angle of pitch of 0°, so that the axial direction of the turbomachine extends parallel to the blade chord. When the values regarded here are extended to a blade with a pitched profile, the values are to be used and/or determined correspondingly rotated by the angle of pitch.

The total width 70 is preferably chosen to be especially narrow, so that as little material as possible is used and the stiffness at the blade root is not too high. At the same time, a second prerequisite needs to be met by the crack-affecting device, namely, that a crack cannot move too precipitously through the blade so as not to grow into the region of higher peripheral stresses, which, in most cases, is the transition region of the blade element to the disk.

The two profile regions 28a and 28b abut each other in the profile transition region 65, with preferably a continuous transition to be created here as well. Therefore, the profile transition region 65 is likewise curved. In particular, the profile transition region 65 is convexly curved in order to simplify the creation of a tangential or continuous transition from the first profile region 28a to the second profile region 28b and to prevent any negative consequences on the flow. In the present exemplary embodiment, the profile transition region 65 has a curvature radius 77 over an angle range 76, which can preferably be constant. The curvature radius 77 can vary over the angle range 76 and along the axial extension of the crack-directing device, because free surfaces adapted to the flow relationships and the spread of the crack are advantageous in comparison to constant radii. Furthermore, the production can be carried out even more simply thereby, and, beyond this, the requirement of a continuous transition can be met in an especially simple way.

A maximum curvature 77 of the profile transition region 65 in this case is preferably greater than a maximum curvature 75a of the first profile region 28a and/or is greater than a maximum curvature 75b of the second profile region 28b. Furthermore, a maximum curvature 75a of the first profile region 28a is greater than a maximum curvature 76a of the second profile region 28b.

It is self-evident that these statements apply to both the suction side 18 and the pressure side 30, with it being possible to design the crack-affecting devices 28 of the two sides 18, 30 differently from each other.

In FIG. 7, for reasons of simplicity, both profile regions 28a and 28b are illustrated by a curvature radius 75a, 75b, 75a', 75b'. In contrast to or in addition to this, the profile regions 28a and 28b are preferably formed by concave free-form surfaces. For each cross section, the curvature radii and/or free-form surfaces of the profile regions extend perpendicular to the axis of rotation of the turbomachine over a corresponding angle range 74a, 74b, 74a', 74b' and thus define the concave surfaces of the profile regions 28a, 28b, 28a', and 28b'. The courses of these radii or free-form surfaces and the angles in the axial direction can be varied continuously in order to produce the courses of the transition region or of the first connecting region shown in FIGS. 6a to 6f. In general, it can be provided that the radii or the maximum curvature of the free-form surfaces and/or of the angle ranges of the profile regions 28a, 28b of the suction side are larger or more greatly manifested than are the corresponding radii or maximum curvature of the free-form surfaces and/or angle ranges of the profile region 28a', 28b' on the pressure side. This may be the case, in particular, in a front region of the blade. It is provided, in particular, that the radius 75a or 75a' or the free-form surface of at least one first profile region 28a, 28a' has a greater curvature than the radius 75b, 75b' or the free-form surface of the second profile region 28b, 28b' on the same pressure side 30 or suction side 18.

In FIG. 7, furthermore, a line of stagger 21 of the profile sections of the blade element 16 is shown. The angle of stagger 79 defining the course of this line 21 is drawn, by way of example, at the bottom radial end of the blade element 16. It is self-evident that this angle can vary along the radial height, so that the course the line of stagger 21 deviates from the straight shape illustrated in FIG. 7. Depending on the angle of stagger 79 or on the course of the line of stagger 21, the radii and angle ranges of the two profile regions 28a, 28b on the suction side and the two profile regions 28a', 28b' on the pressure side can be coordinated with each other.

Finally, dashed circles are illustrated in FIG. 7 and are intended to highlight, by way of example, the use of milling tools for producing the two profile regions. In this case, the production method is carried out with the following steps:

Initially present is a blank of a blisk, for example, as a cast and subsequently forged separate part or welded-together part composed of blade and disk. In order to produce the crack growth device, the blank is milled in both regions by using a first milling tool 90a with the first diameter 91a in order to create the profile regions 28a, 28b, 28a', 28b' of the pressure side and/or of the suction side as well as the profile transition region. It is also possible to use more than one milling tool, in which case, in the region of the first profile region 28a, 28a', it is possible initially to use a milling tool 90a to mill a first diameter 91a and subsequently to use a milling tool 90b with a second diameter 91b to mill in the region of the second profile region 28b, 28b' In a further step, another milling tool (not shown) can mill a radius, a chamfer, or a free-form surface at the profile transition region 65.

FIG. 8a shows a cross section of a crack-affecting device in the blade root region of a blade according to the invention. The crack-affecting device in this exemplary embodiment has two profile regions 28a and 28b, which are similar in design to the above-described exemplary embodiments. Drawn is a dashed circle B, which marks the excerpt shown in FIG. 8b. The two profile regions 28a, 28b transition tangentially into the adjoining blade element 16 or into the adjoining endwall 26, which is shown by the two symbols consisting of two parallel lines drawn at an angle to the structure lines. In contrast to this, it is provided that, between the two profile regions 28a, 28b at the profile transition region 28c, a transition angle 82 is formed, which lies between 0° and 180° and, in the schematically drawn exemplary embodiment, is about 90°. The transition angle 82 is formed between a first tangent 81a at the first profile region 28a and a second tangent 81b at the second profile region 28b. In this case, the two tangents 81a, 81b are drawn in the cross section shown at the connecting points of the two profile regions 28a, 28b to the profile transition region 28c. It can clearly be seen that the two profile regions 28a, 28b do not transition tangentially into each other. A jump in stiffness is thereby advantageously achieved. Beyond this, it is advantageously possible, by a suitable choice of the angle of the two tangents 81a, 81b to deliberately influence the direction of crack spread.

The transition angle 82 can vary along the extension of the crack-affecting device 28 around the blade. Thus, the transition angle 82 in the full region 61 assumes a maximum value. In the terminating region 62, the transition angle 82 can vary from the maximum value down to a minimum value. The value of the transition angle 82 can also assume a locally maximum value in the terminating region 62. The minimum value of the transition angle 82 can then be zero in the free region 63.

Further shown in FIGS. 8a and 8b is a distance 83 of the crack-affecting device to a radius. The dashed illustrated radius begins at the connecting point of the first profile region 28a at the blade element 16 and ends at the endwall 26 at the connecting point of the second profile region 28b. In this case, the radius transitions tangentially into the blade element 16 and the endwall 26. The distance 83 is always the minimum distance of a point on the profile regions 28, 28b or on the profile transition region 28c to the radius. It can also be provided that an averaged distance 83 of the surface of the crack-affecting device 28 to the radius in a cross section is approximately zero. This means that the distance 83 is negative in some regions. It is thereby possible to create a crack-affecting device for approximately the same material weight.

The distance 83, in particular in the profile transition region 28c, can vary along the extension of the crack-affecting device 28 around the blade. Thus, a distance 83, in particular in the profile transition region 28c, can assume a maximum value in the full region 61. In the terminating region 62, the distance 83, in particular in the profile transition region 28c, can vary from the maximum value to a minimum value. The value of the distance 83 can, in particular in the profile transition region 28c, also assume a local maximum value in the terminating region 62. The minimum value of the distance 83 along the extension of the crack-affecting device 28 around the blade can then be zero in the free region 63. In considering the course of the distance 83 around the blade, this may preferably always involve a distance of the connecting point between the first profile region 28a and the transition region 28c or always a distance of the connecting point between the second profile region 28b and the transition region 28c.

The parameter values presented in the documents for definition of the process and measurement conditions for the characterization of specific properties of the subject of the invention are also to be regarded within the scope of deviations—for example, deviations due to measurement errors, system errors, DIN tolerances and the like—as being included in the scope of the invention.

What is claimed is:

1. A blade for a turbomachine, comprising:
   a blade element with a suction side and a pressure side, which extend between a leading edge and a trailing edge of the blade element; and
   a blade root for connection of the blade at a main rotor body;
   wherein the blade comprises a crack-affecting device, which, in at least the radial direction and/or in the peripheral direction, has an altered cross-sectional geometry in comparison to an aerodynamically optimized blade profile,
   wherein the crack-affecting device has at least two profile regions at least partially along the pressure side and/or the suction side, and at least one first profile region of the at least two profile regions extends at least partially around the blade from a leading edge of the blade to a trailing edge of the blade, so that a full region, a terminating region, and a region free of the crack-affecting device are formed,
   wherein the extension of the full region along the axial extension of the pressure side and/or of the suction side is in a range that corresponds to at least 30% of the extension of the pressure side or of the suction side and/or the extension of the free region along the axial extension of the pressure side and/or of the suction side is in a region that corresponds to at least 5% of the extension of the pressure side or of the suction side.

2. The blade according to claim 1, wherein, in that the crack-affecting device comprises at least one depression that partially or fully extends around the blade element in the axial direction.

3. The blade according to claim 2, wherein the depression is arranged radially above a fillet, which is formed in the connecting region of the blade element to the blade root.

4. The blade according to claim 1, wherein the crack-affecting device comprises a pedestal, wherein the pedestal is arranged between the blade element and the blade root and has a larger cross-sectional thickness than the blade element.

5. The blade according to claim 4, wherein two mutually adjoining profile regions of the at least two profile regions have a transition angle lying between 0° and 180°.

6. The blade according to claim 4, wherein, with a maximum blade thickness, the blade is configured with a ratio of the pedestal thickness to the maximum blade thickness that lies in the range of 15 to 150 and the ratio of the pedestal thickness to the maximum blade thickness is present over the entire axial longitudinal extension of at least one of the profile regions.

7. The blade according to claim 4, wherein, with a maximum peripheral extension of the blade root, the blade is configured with a ratio of the pedestal thickness to the maximum peripheral extension of the blade root that is in the range of 1% to 10%.

8. The blade according to claim 4, wherein a ratio of pedestal height to maximum blade thickness is in the range of 4 to 60.

9. The blade according to claim 4, wherein, with a blade chord length, a ratio of the blade chord length to a maximum pedestal height is in the range of 2 to 60.

10. The blade according to claim 4, wherein the at least two profile regions have different concave and/or convex surfaces, and/or in that the at least two profile regions adjoin each other continuously and/or discontinuously.

11. The blade according to claim 1, wherein the crack-affecting device comprises at least one rounding, which is arranged radially above a fillet that is formed in the connecting region of the blade element at the blade root.

12. The blade according to claim 1, wherein the crack-affecting device has continuous transition regions in adjoining blade regions.

13. The blade according to claim 1, wherein the crack-affecting device comprises at least one depression extending in the axial direction in a radially inner endwall.

14. The blade according to claim 1, wherein the crack-affecting device comprises depressions extending on both sides of the blade element in the axial direction in the radially inner endwall.

15. The blade according to claim 1, wherein the blade is coupled to the main rotor body of a blisk.

16. The blade according to claim 1, wherein the blade is configured and arranged in a turbomachine.

17. A method for producing a blade at a rotor disk from a blank of a blisk, wherein, in a transition region between a root of a blade element and a main rotor body, the blade has a crack-directing device, wherein the crack-directing device has a first profile region adjoining the blade element, wherein the crack-directing device has a second profile region adjoining the rotor disk, wherein the method comprises the following steps:

milling of the first profile region with a first milling tool having a first diameter; and milling of the second profile region with the first milling tool and/or with a second milling tool having a second diameter differing from the first diameter, wherein the first profile region extends at least partially around the blade from a leading edge of the blade to a trailing edge of the blade, so that a full region, a terminating region, and a region free of the crack-directing device are formed, wherein the extension of the full region along the axial extension of the pressure side and/or of the suction side is in a range that corresponds to at least 30% of the extension of the pressure side or of the suction side and/or the extension of the free region along the axial extension of the pressure side and/or of the suction side is in a region that corresponds to at least 5% of the extension of the pressure side or of the suction side.

18. A blade for a turbomachine, comprising, a blade element with a suction side and a pressure side, which extend between a leading edge and a trailing edge of the blade element; and a blade root for connection of the blade to a main rotor body;

wherein the blade comprises a crack-directing device, which, in at least the radial direction, has an altered cross-sectional geometry in comparison to an aerodynamically optimized blade profile, wherein the crack-directing device has at least two profile regions at least partially along the pressure side and/or the suction side, and at least one first profile region of the at least two profile regions extends at least partially around the blade from a leading edge of the blade to a trailing edge of the blade, so that a full region, a terminating region, and a region free of the crack-directing device are formed, wherein the extension of the full region along the axial extension of the pressure side and/or of the suction side is in a range that corresponds to at least 30% of the extension of the pressure side or of the suction side and/or the extension of the free region along the axial extension of the pressure side and/or of the suction side is in a region that corresponds to at least 5% of the extension of the pressure side or of the suction side.

* * * * *